Feb. 20, 1962

W. RODWELL 3,022,239

NUCLEAR REACTOR MODERATOR STRUCTURES

Filed July 1, 1958

2 Sheets-Sheet 1

INVENTOR
WILLIAM RODWELL
BY Larson and Taylor
ATTORNEYS

United States Patent Office 3,022,239
Patented Feb. 20, 1962

---

3,022,239
NUCLEAR REACTOR MODERATOR STRUCTURES
William Rodwell, Culcheth, near Warrington, England, assignor to United Kingdom Atomic Energy Authority, London, England
Filed July 1, 1958, Ser. No. 746,004
Claims priority, application Great Britain July 1, 1957
3 Claims. (Cl. 204—193.2)

This invention relates to moderator structures for nuclear reactors.

When graphite is used as a moderator in a nuclear reactor one of the problems to be overcome is the accommodation of its growth under irradiation (Wigner growth). This problem has been solved in one way in a manner disclosed in U.S.P. 2,864,759; however, when a graphite moderator structure is required as a part of a reactor built into a moving body, such as a ship, a very robust design is required to withstand the forces consequent upon accelerations in diverse directions.

The present invention provides a graphite moderator structure suitable for installation as a part of reactor powered ship, the structure being partly compensated in respect of Wigner growth.

The graphite moderator structure according to the invention comprises stacks of uniform right prismatic graphite blocks positioned in layers extending one beyond the other in the direction of the lengths of the blocks, the blocks defining coolant channels parallel to their length and having minimum Wigner growth properties in the direction of their length and layers of graphite tiles alternating with the layers of blocks said tiles having the following characteristics: first, they define coolant channels continuous with the channels defined by the blocks, second, each tile is in side face contact with all tiles adjacent to it in its layer, third, each tile has minimum Wigner growth properties in a direction which is both perpendicular to the longitudinal axis of the blocks and perpendicular to the direction of minimum Wigner growth in tiles adjacent to it in its layer, fourth, the tiles are wider than the blocks in the direction of minimum Wigner growth in the tiles, and fifth, the tiles are keyed to the blocks; and means providing centripetal restraint forces to each layer of tiles.

Figure 1:
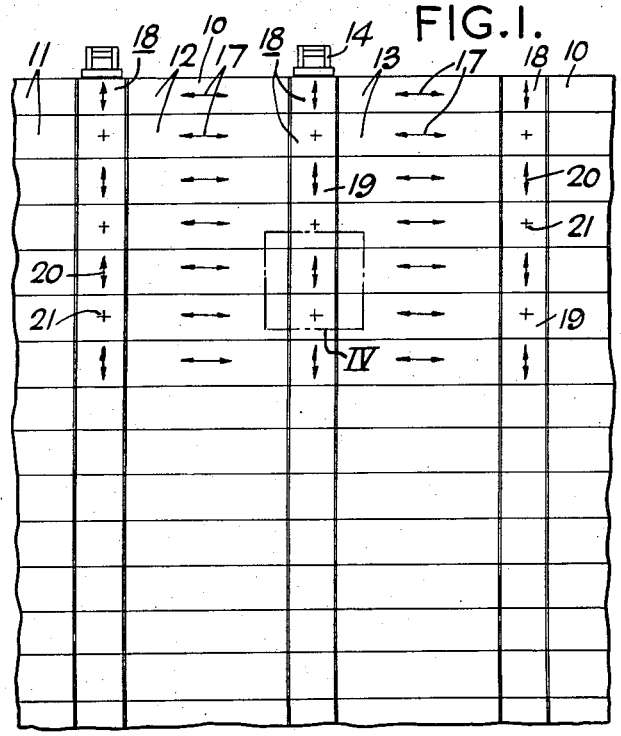
Figure 2:
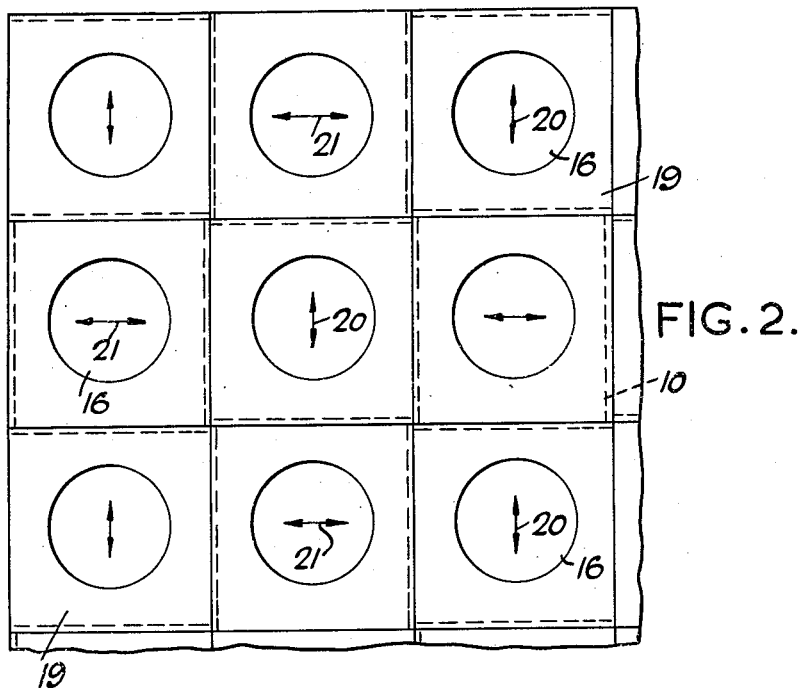
Figure 3:
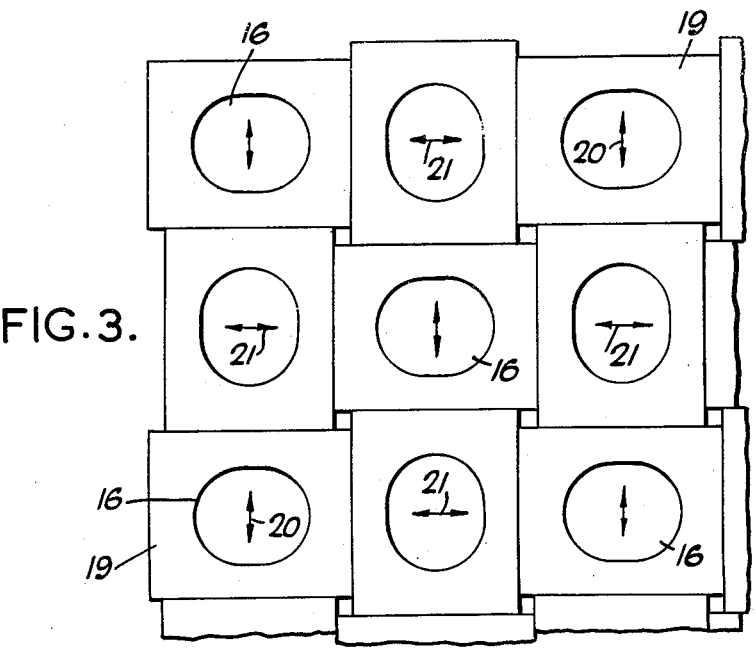

A preferred form of the invention will now be described with reference to the accompanying drawing wherein:

FIG. 1 is a diagrammatic side elevation of a part of a moderator structure. FIG. 2 and FIG. 3 are plan views showing conditions before and after irradiation respectively and FIG. 4 is an enlarged sectional view of the part of the structure shown in FIG. 1 identified by the frame IV.

In the drawings right prismatic graphite blocks 10 of rectangular cross section are positioned in layers 11, 12, 13, etc. The blocks define coolant channels 16 and have minimum Wigner growth properties in the direction of their length as indicated by the double headed arrows 17. Layers 18 of graphite tiles 19, (square in section and having sides the same length as the longer sides of the blocks 10) alternate with the layers of blocks 10 and also define coolant channels 16 (FIG. 4). The direction of minimum Wigner growth in the tiles is indicated by the arrows 20, 21, and is perpendicular to the direction of minimum Wigner growth in the blocks 10 which have their shorter sides parallel to the direction of minimum Wigner growth in the neighbouring tiles 19. The tiles 19 are all in contact and are restrained by bands 14. Typically the tiles 19 are nine inch cubes and the blocks 10 9" x 8½" x 31.2".

In the course of growth of tiles 19 under irradiation their shape changes from that shown in FIG. 2 to that shown in FIG. 3. It is seen that the side faces of the tiles remain in contact and their axes move apart by an amount equal to half the sum of minimum and maximum growth in two nine inch dimensions. Their movement also moves the blocks 10 which have themselves expanded an amount equal to maximum Wigner growth in a nine inch dimension. Thus, where the direction of maximum Wigner growth in tile and block coincide, expansions are equal but where minimum growth in a tile coincides with maximum growth in a block, the block will, if of the same size as the tile, become wider than the tile. This is avoided by the rectangular section of the block which has one dimension of less than nine inches. When the condition of FIG. 3 is reached tile and block have the same rectangular dimensions.

Figure 4:
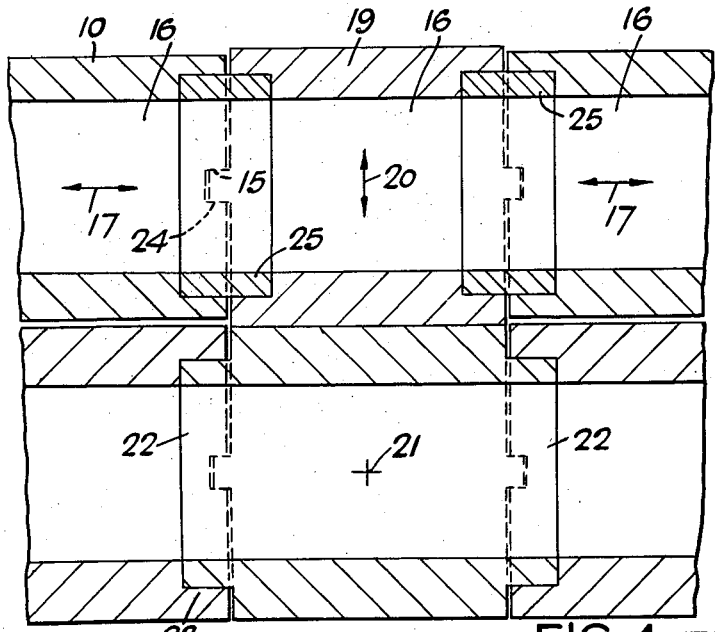

FIG. 4 shows two alternative methods of closing the gap between the ends of the blocks to avoid out of channel leakage of coolant.

According to one method, the tiles 19 are provided with spigots 22 which fit into cut away parts 23 in the blocks 10 and effect a gas seal for the coolant channels 16. In the second method a separate sleeve 25 replaces the spigot 22. The tiles 19 carry keys 15 which rest in keyways 24 in the blocks 10 and take the weight of the blocks 10.

In the end layer of tiles the direction of minimum Wigner growth is arranged to be the same as in the blocks so that solid end faces are obtained thus avoiding coolant gas by-passing the coolant channels by travelling along the spaces between the graphite blocks. These end layers are only subjected to a moderate neutron flux and the accommodation of their growth is not a problem.

I claim:

1. A graphite moderator structure comprising stacks of uniform right prismatic graphite blocks positioned in layers extending one beyond the other in the direction of the lengths of the blocks, the blocks defining coolant channels parallel to their length and having minimum Wigner growth properties in the direction of their length and layers of graphite tiles alternating with the layers of blocks said tiles having the following characteristics: first, they define coolant channels continuous with the channels defined by the blocks, second, each tile is in side face contact with all tiles adjacent to it in its layer, third, each tile has minimum Wigner growth properties in a direction which is both perpendicular to the longitudinal axis of the blocks and perpendicular to the direction of minimum Wigner growth in tiles adjacent to it in its layer, fourth, the tiles are wider than the blocks in the direction of minimum Wigner growth in the tiles and fifth, the tiles are keyed to the blocks; and means providing centripetal restraint forces to each layer of tiles.

2. A graphite moderator structure as claimed in claim 1 wherein the tiles have spigots which fit into cut away parts in the blocks.

3. A graphite moderator structure as claimed in claim 1 wherein between each tile and block is a separate graphite sleeve which fits into cut away parts in the tile and the block.

References Cited in the file of this patent

UNITED STATES PATENTS

| | | |
|---|---|---|
| 2,838,451 | Long et al. | June 10, 1958 |
| 2,852,457 | Long et al. | Sept. 16, 1958 |